United States Patent [19]

Crouch et al.

[11] Patent Number: 4,946,531
[45] Date of Patent: Aug. 7, 1990

[54] PROCESS FOR HARDCOATING POLYCARBONATE SHEET

[75] Inventors: Earl T. Crouch; Ronald F. Sieloff, both of Evansville, Ind.

[73] Assignee: General Electric Company, Pittsfield, Mass.

[21] Appl. No.: 278,649

[22] Filed: Dec. 1, 1988

[51] Int. Cl.$^5$ .............................................. B32B 31/28
[52] U.S. Cl. ................................ 156/242; 156/244.17; 156/272.2; 156/273.3; 156/273.5; 427/54.1; 427/164
[58] Field of Search ................ 156/242, 244.17, 272.2, 156/273.3, 273.5, 273.7; 427/35, 44, 54.1, 161, 163, 164

[56] References Cited

U.S. PATENT DOCUMENTS

| | | |
|---|---|---|
| 4,478,876 | 10/1984 | Chung .................................. 427/54.1 |
| 4,533,446 | 8/1985 | Conway et al. ................... 156/273.3 |
| 4,552,604 | 11/1985 | Green ................................ 156/273.3 |
| 4,557,975 | 12/1985 | Moore ................................ 427/54.1 |
| 4,617,194 | 10/1986 | Scott et al. ......................... 427/54.1 |
| 4,668,588 | 5/1987 | Kishima .............................. 427/54.1 |
| 4,814,207 | 3/1989 | Siol ..................................... 427/164 |

Primary Examiner—Caleb Weston
Attorney, Agent, or Firm—Spencer D. Conard

[57] ABSTRACT

A process for preparing a hardcoated polycarbonate sheet involves (i) ultraviolet radiation curing an acrylic coating onto one surface of a flexible polycarbonate film via a drum casting technique to yield a flexible, abrasion and chemical resistant hardcoated film; and (ii) laminating the hardcoated film onto a thick rigid polycarbonate substrate by an on-line ultraviolet radiation lamination method. The process is fast, requires minimal labor and provides high optical quality hardcoats for polycarbonate sheet.

2 Claims, 5 Drawing Sheets

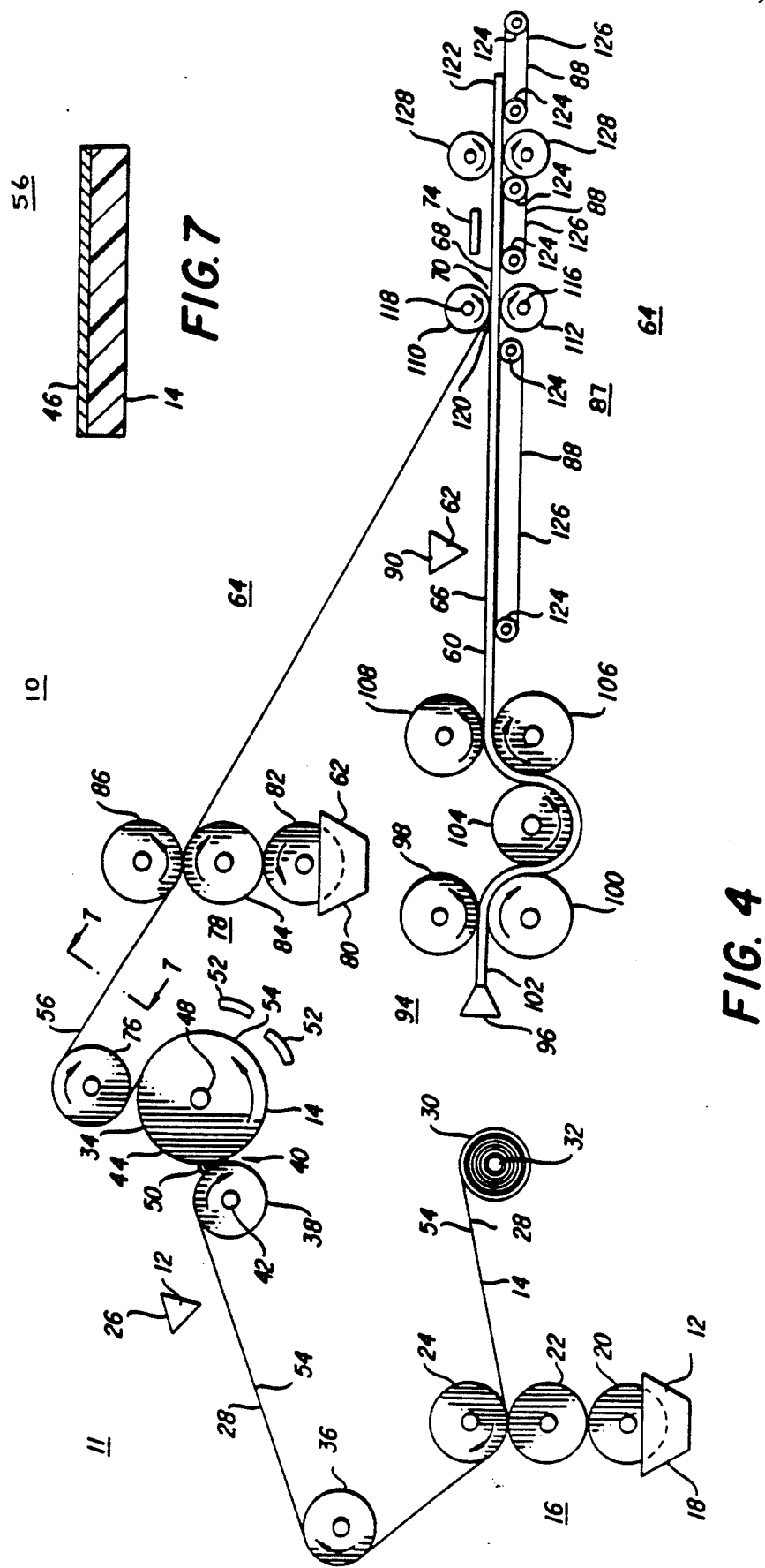

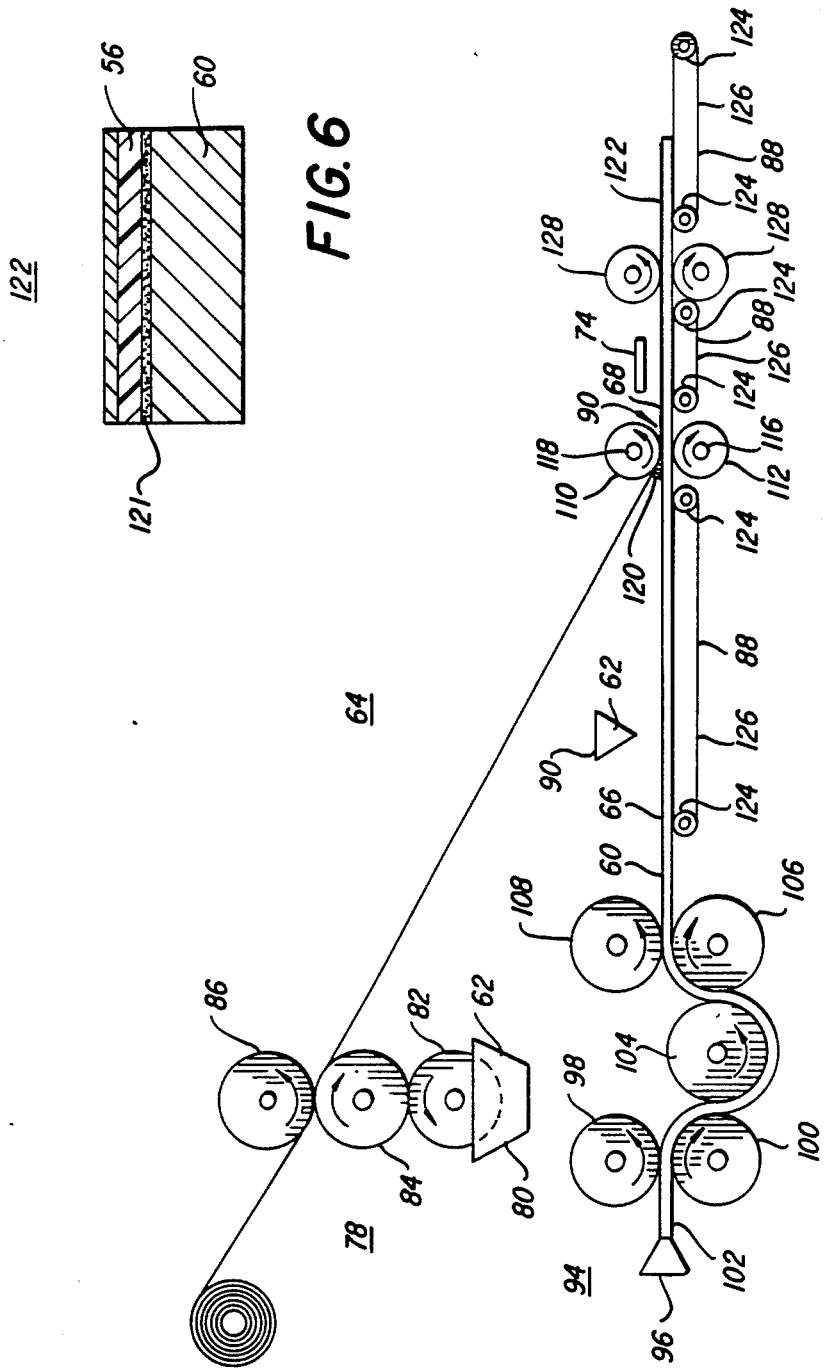

PROCESS FOR HARDCOATING POLYCARBONATE SHEET

BACKGROUND OF THE INVENTION

1. Field of the Invention

The present invention relates to a process for hardcoating polycarbonate sheet and, more particularly, relates to a process for providing a high quality, abrasion and chemical resistant coating onto a thick, rigid polycarbonate substrate.

2. Description of Related Art

The substitution of glass with sheets made from aromatic polycarbonates provides the major advantage of shatter resistance and weight reduction but comes with the drawbacks of low mar and scratch resistance. Attempts to improve the abrasion resistance of these polycarbonate sheets have included the application of various coatings, such as silicone coatings, solvent-free acrylic coatings and solvent-based acrylic coatings, to the surface thereof. Silicone coatings, however, typically have a number of shortcomings including the use of solvents therein to decrease viscosity and enhance leveling during application thereof. These solvents are expensive, pose potential environmental hazards and require substantial periods of time and energy to effect removal thereof during drying of the coatings. Silicone coatings also suffer from the requirement of substantial heat application and substantial cure times to effect curing and hardening of the coating layer. These drawbacks result in a somewhat slow and expensive coating process.

Solvent-free acrylic coatings have also had a number of problems associated with their application to aromatic polycarbonate sheets. Namely, solvent-free acrylic coatings have relatively high viscosities often in excess of 50 centipoise and sometimes as high as 5000 centipoise resulting in their tendency to resist leveling after application to the sheet thus resulting in an unacceptable degree of imperfections such as roughness, waviness and striations in the final hardcoat. For example, roll coating of solvent-free acrylic coatings onto polycarbonate substrates often results in the presence of visible striations in the final hardcoat. Spraying techniques for application of these high viscosity coatings result in bubbles which are visible in the cured coating, and the employ of processes such as dip coating are typically very slow production processes which do not permit high-speed on-line production. An additional problem associated with acrylic coatings is that when they are cured by ultraviolet radiation, they must be in a substantially diatomic oxygen-free atmosphere, and thus prior acrylic sheet coating processes have typically required the use of a nitrogen purge chamber for the ultraviolet radiation curing thereof. The nitrogen purge chambers add equipment requirements and potential suffocation hazards to the process. Prior solutions to overcome the problems associated with the use of high viscosity acrylic coatings on polycarbonate sheets have included the addition of solvents thereto to reduce the viscosity of the coatings and promote their leveling tendencies. Solving the problem of high viscosity by the addition of solvents, however, simply trades off one problem for another. Specifically, while the problem of high viscosity may have been solved, the aforementioned problems associated with solvents have been added to the system.

Additional problems have also been associated with prior processes for the production of hardcoated polycarbonate sheet. Specifically, when polycarbonate sheet is extruded it must be trimmed at its outer edges to form substantially rectangular sheets of uniform width and length. The strips of polycarbonate trimmed from the sheets are then either discarded, which is wasteful and which adds cost to the process, or the scrap is recycled into the resin of subsequent sheets. Additionally, poor quality hardcoated sheets resulting from hardcoating operations can either be discarded, which is wasteful and costly, or may be chopped up and recycled into resin for subsequent sheet production. As a practical matter, however, whenever recycled polycarbonate plastic is employed in the production of polycarbonate sheets, the resultant sheets often have surface defects and surface characteristics that are undesirable. For example, small indentations may be present at the surface or small pieces of dirt or sand may be present at the surface. These surface defects are typically still visible after the application of thin acrylic coatings thereto by conventional sheet coating techniques and the employ of thick solvent-free acrylic coatings is generally too expensive and too difficult to effectively cure. Thus, it has been generally impractical in the past to produce high surface quality coated sheet which employs recycled or low quality polycarbonate resin.

Accordingly, one object of the present invention is to provide an improved process for applying solvent-free acrylic hardcoats to polycarbonate sheet.

Another object is to provide a coating process which will effectively mask surface imperfections in the underlying sheet.

A further object is to provide a high-speed process for producing high quality coatings on polycarbonate sheet.

SUMMARY OF THE INVENTION

A process for hardcoating polycarbonate sheet with a clear acrylic coating is provided which involves (a) producing a high quality, ultraviolet radiation cured coating on a thin, transparent, flexible polycarbonate film via a high-speed casting process and (b) laminating the hardcoated film to a thick, rigid polycarbonate substrate via a nip lamination process employing an ultraviolet radiation curable adhesive. The resultant hardcoated sheet has excellent surface characteristics and can be produced at production rates much faster than standard sheet hardcoating procedures.

BRIEF DESCRIPTION OF THE DRAWINGS

FIG. 4 is a schematic side elevational view of an apparatus for continuous sheet hardcoating pursuant to the process of the present invention employing a continuously extruded sheet;

FIG. 5 is a schematic side elevational view of a laminating section employing a storage roll for the hardcoated film and employing a continuously extruded sheet;

FIG. 6 is an enlarged vertical cross section of a portion of hardcoated sheet taken above line 6—6 of FIG. 3;

FIG. 7 is an enlarged cross section of a hardcoated film taken along line 7—7 of FIG. 1; and FIG. 8 is an enlarged cross section of a film/sheet overlay taken along line 8—8 of FIG. 1.

DETAILED DESCRIPTION OF THE INVENTION

Figure 1:
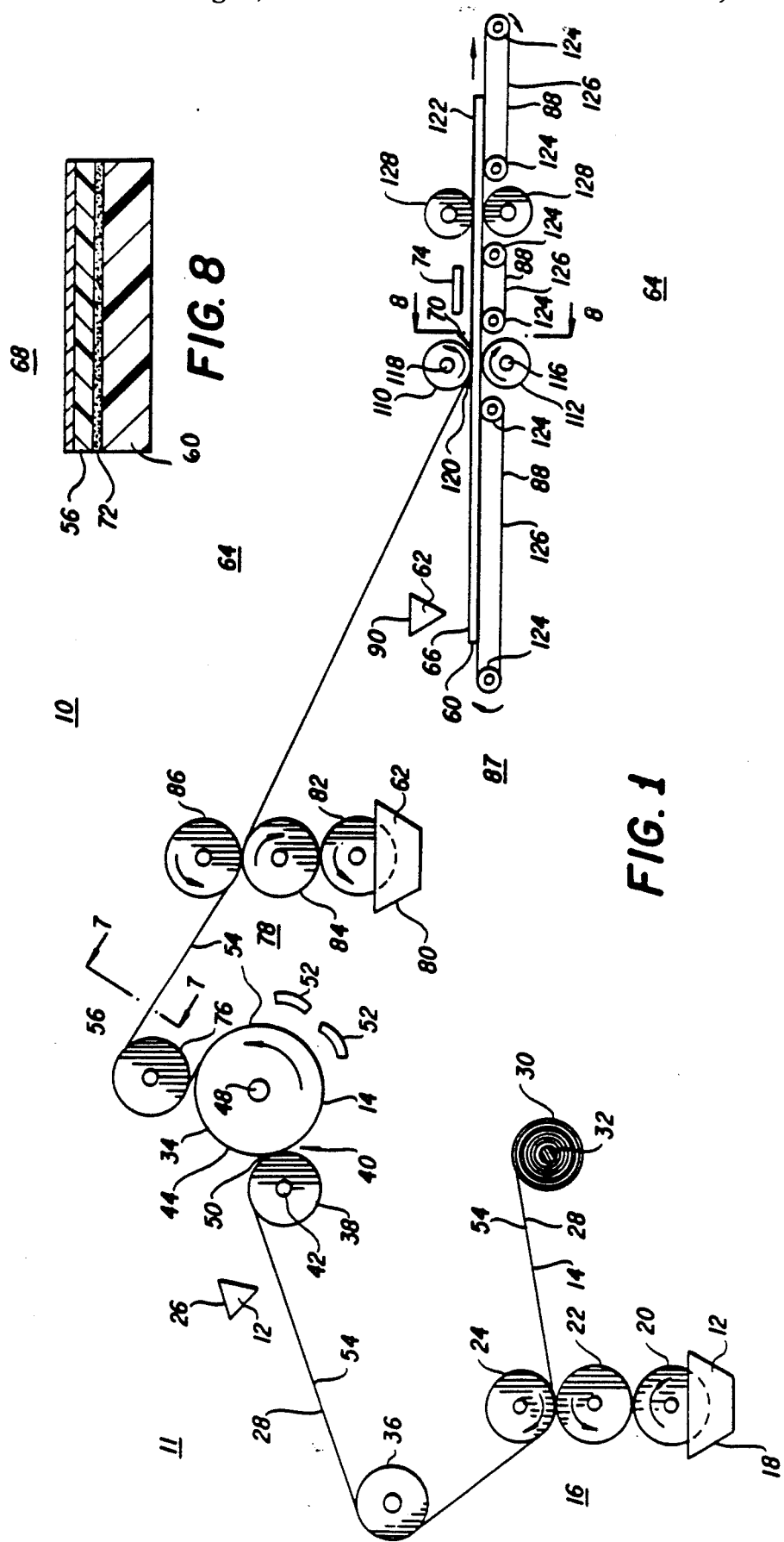
FIG. 1 is a schematic side elevational view of an apparatus for continuous sheet hardcoating discrete individual sheets pursuant to the process of the present invention.

The process of the present invention comprises the steps of:

(a) hardcoating a flexible aromatic polycarbonate film having a thickness selected from between about 0.5 mil and about 30 mils, the hardcoating of the film being a continuous procedure involving:

(i) applying an uncured coating material to a surface of the film, the coating material comprising an amount of polyfunctional acrylate ester monomers and an amount of a photoinitiator, (ii) passing the film and applied uncured coating material through a constant pressure compression nip, defined between a longitudinally rotating cylindrical casting drum and a longitudinally rotating cylindrical nip roll, the casting drum and the nip roll having parallel axes of rotation, the nip roll contacting an uncoated surface of the film and the casting drum contacting the applied uncured coating material, the compression nip exerting a substantially constant pressure to said film having the applied uncured coating thereon, said compression nip pressure being selected from between about 5 psi and about 50 psi to eliminate air and excess coating material from between the film and the drum thereby providing a substantially uniform layer of uncured coating material between the drum and the film, said excess coating material forming a bead of coating material between said film and said casting drum across the width of said film adjacent to and upstream from said compression nip;

(iii) curing the coating layer by directing ultraviolet radiation through the film to the coating layer while the coating layer is in anaerobic contact with the drum surface to provide a hardcoated film having a cured coating having surface characteristics determined by the casting drum surface, the cured coating having a thickness selected from between 0.1 mils and 1.0 mils;

(b) laminating the hardcoated film onto a rigid aromatic polycarbonate substrate, the substrate having a thickness selected from between about 35 mils to about 1000 mils, the laminating involving:

(i) preparing an overlay by placing an amount of an acrylic adhesive between a surface of the substrate and an uncoated surface of the hardcoated film, and by bringing the uncoated surface of the film into a position adjacent to the surface of said substrate;

(ii) passing the overlay through a laminating nip to eliminate diatomic oxygen and excess adhesive from between the film and the substrate, said laminating nip pressing the overlay with a substantially constant pressure to create a substantially uniform layer of adhesive between the film and the substrate, said excess adhesive forming a bead of adhesive across the width of said substrate between said substrate and said film adjacent to and upstream from said laminating nip; and (iii) curing the adhesive layer by directing ultraviolet radiation through the film to the adhesive layer to cure the adhesive layer and bond the hardcoated film to the substrate, said cured adhesive layer having a thickness selected from between 0.2 mil and 2.0 mil.

The aromatic polycarbonate film is most preferably a bisphenol-A polycarbonate, such as Lexan® resin, a product of General Electric Company, and is obtained by the reaction of bisphenol-A with phosgene as set forth in U.S. Pat. No. 4,351,920. Other suitable aromatic polycarbonate resins may be obtained by reacting aromatic dihydroxy compounds with either phosgene or diaryl carbonates. Polycarbonate film may be made by well-known methods such as calendering molten polycarbonate on an extrusion roll stack to form a polished polycarbonate film having a substantially uniform thickness, although thickness variations of ±10% are not uncommon. The film is transparent and the thickness of the film is preferably between 0.5 mil and 30 mils and should be 30 mils or less in thickness to permit adequate passage of ultraviolet radiation therethrough to effect curing of an acrylic hardcoat thereon. The uncoated film must be flexible in order to be suitable for the process of the present invention.

The ultraviolet radiation curable coating material of the present invention must be solvent free and should have an abrasion resistance when cured such that when employing a CS10F wheel and a 500 gram loading according to ASTM testing procedures, there is less than a 10% change in haze per 100 cycles for pure organic hardcoats and there is a less than 10% change in haze per 500 cycles for transparent silica reinforced hardcoats. This degree of abrasion resistance of the hardcoat compares favorably with that of the best prior art hardcoats. The preferred acrylic coating compositions typically have viscosities of between 100 centipoise and 1000 centipoise. The acrylic coating material of the present invention comprises polyfunctional acrylate ester monomers and a photoinitiator. The polyfunctional acrylate ester monomers of the present invention are represented by the general formula:

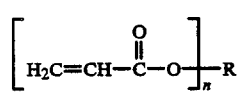
[1]

where n is an integer from 2 to 8, preferably from 2 to 6, and more preferably from 2 to 4; and R is selected from n valent hydrocarbon residue, n valent substituted hydrocarbon residue, n valent hydrocarbon residue containing at least one ether linkage, and n valent substituted hydrocarbon residue containing at least one ether linkage.

Preferred n valent hydrocarbon residues are the n valent aliphatic, preferably saturated aliphatic, hydrocarbon residues containing from 1 to about 20 carbon atoms and the n valent aromatic hydrocarbon residues containing from 6 to about 10 carbon atoms.

Preferred n valent hydrocarbon residues containing at least one ether linkage are the n valent aliphatic hydrocarbon residues, preferably saturated aliphatic hydrocarbon residues, containing from 1 to about 5 ether linkages and from 2 to about 20 carbon atoms.

Preferred n valent substituted hydrocarbon residues are the n valent aliphatic hydrocarbon residues, preferably the saturated aliphatic hydrocarbon residues, containing from 1 to about 20 carbon atoms and the n valent aromatic hydrocarbon residues containing from 6 to 10 carbon atoms, which may contain substituent groups such as; the halogens, for example, fluorine, chlorine, bromine and iodine; hydroxyl; —COOH; and —COO-R$^{IV}$ groups, wherein R$^{IV}$ represents alkyl groups containing from 1 to about 6 carbon atoms.

Preferred n valent substituted hydrocarbon residues containing at least one ether linkage are the n valent aliphatic hydrocarbon residues, preferably saturated aliphatic hydrocarbon residues, containing from 2 to about 20 carbon atoms and from 1 to about 5 ether linkages, which contain substituent groups such as; halogen, hydroxyl, —COOH, and —COOR$^{IV}$ groups wherein R$^{IV}$ is as defined above.

It is to be understood that where substituent groups are present, they should be such that they do not unduly hinder or interfere with the photocure of the polyfunctional acrylic monomers.

The more preferred polyfunctional acrylic monomers are those represented by formula 1 wherein R is an n valent saturated aliphatic hydrocarbon residue containing from 1 to about 20 carbon atoms, a hydroxyl substituted n valent saturated aliphatic hydrocarbon residue containing from 1 to about 20 carbon atoms, an n valent saturated aliphatic hydrocarbon residue containing from 2 to about 20 carbon atoms and from 1 to about 5 ether linkages, and a hydroxyl substituted n valent saturated aliphatic hydrocarbon residue containing from 2 to about 20 carbon atoms and from 1 to 5 ether linkages.

The most preferred polyfunctional acrylate ester monomers are those wherein R in formula 1 is an n valent saturated aliphatic hydrocarbon, ether, or polyether radical. The monomers wherein R is an n valent saturated aliphatic hydrocarbon radical are particularly suitable.

The difunctional acrylic monomers, or diacrylates, are represented by formula 1 wherein n is 2; the trifunctional acrylate monomers, or triacrylates, are represented by formula 1 wherein n is 3; and the tetra-functional acrylic monomers, or tetraacrylates, are represented by formula 1 wherein n is 4.

Illustrative of suitable polyfunctional acrylate ester monomers of formula 1 are those listed below.

CH$_2$=CHCOO—CH$_2$—OOCH=CH$_2$

CH$_2$=CHCOO—CH$_2$—CH$_2$—OOCCH=CH$_2$

CH$_2$=CHCOO—CH$_2$CHOHCH$_2$—OOCCH=CH$_2$

CH$_2$=CHCOO—(CH$_2$)$_6$—OOCCH=CH$^2$

CH$_2$=CHCOO—CH$_2$CH$_2$OCH$_2$CH$_2$—OOCCH=CH$_2$

CH$_2$=CHCOO—CH$_2$CH$_2$OCH$_2$CH$_2$OCH$_2$CH$_2$OCH$_2$CH$_2$—OOCCH=CH$_2$

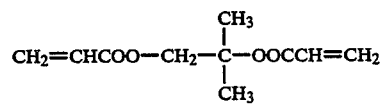

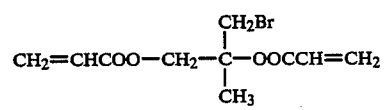

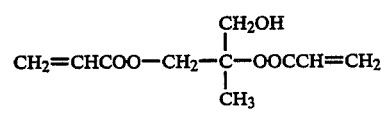

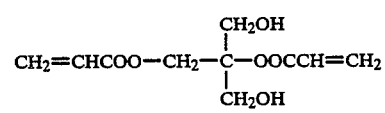

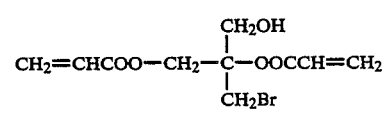

CH$_2$=CHCOO—CH$_2$—CH=CH—CH$_2$—CH$_3$—OOCCH=CH$_2$

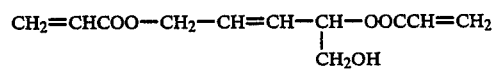

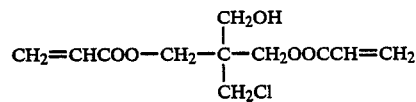

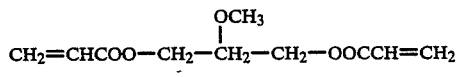

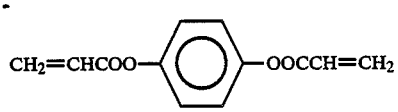

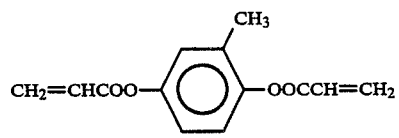

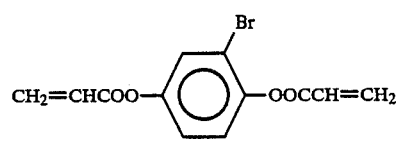

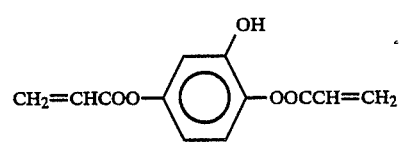

-continued

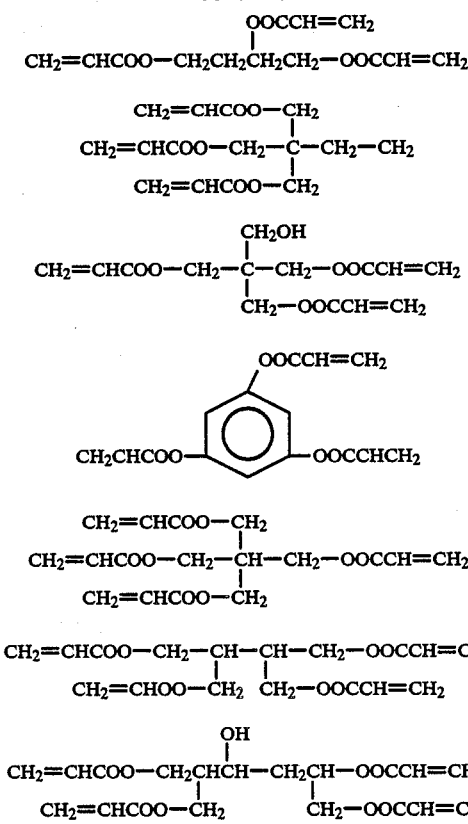

These polyarylate esters and their production are well known to those skilled in the art. One method of producing the di-, tri-, and tetraacrylate esters involves reacting acrylic acid with a di-, tri-, or tetra-hydroxyl compound to produce the diester, triester or tetraester. Thus, for example, acrylic acid can be reacted with ethylene glycol to produce ethylene glycol diacrylate.

Although the coating compositions may contain one or more of said polyfunctional acrylate monomers, preferred coating compositions contain a mixture of two polyfunctional monomers, preferably a diacrylate and a triacrylate. When the preferred coating composition contains a mixture of diacrylate and triacrylate monomers, it is preferred that the ratio, by weight, of the diacrylate to the triacrylate be from about 30/70 to about 70/30. Examplary mixtures of diacrylates and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

The coating composition employed may also be a transparent silica reinforced, solvent-free hardcoat. Such coating compositions may contain up to 40% by weight of functionalized silica therein.

The ultraviolet radiation curable coating composition contains the aforementioned photoinitiator in an amount effective to effect the ultraviolet radiation cure of the coating composition. Generally, this amount is from about 0.01% to about 10% by weight, preferably from about 0.1% to about 5% by weight of the coating composition. Some nonlimiting examples of these UV radiation photoinitiators include ketones, such as benzophenone, acetophenone, benzil, benzyl methyl ketone; benzoins and substituted benzoins such as benzoin methyl ether, a-hydroxymethyl benzoin isopropyl ether; halogen containing compounds such as a-bromoacetophenone, p-bromoacetophenone, a-chloromethylnapthalene, and the like.

Figure 2:
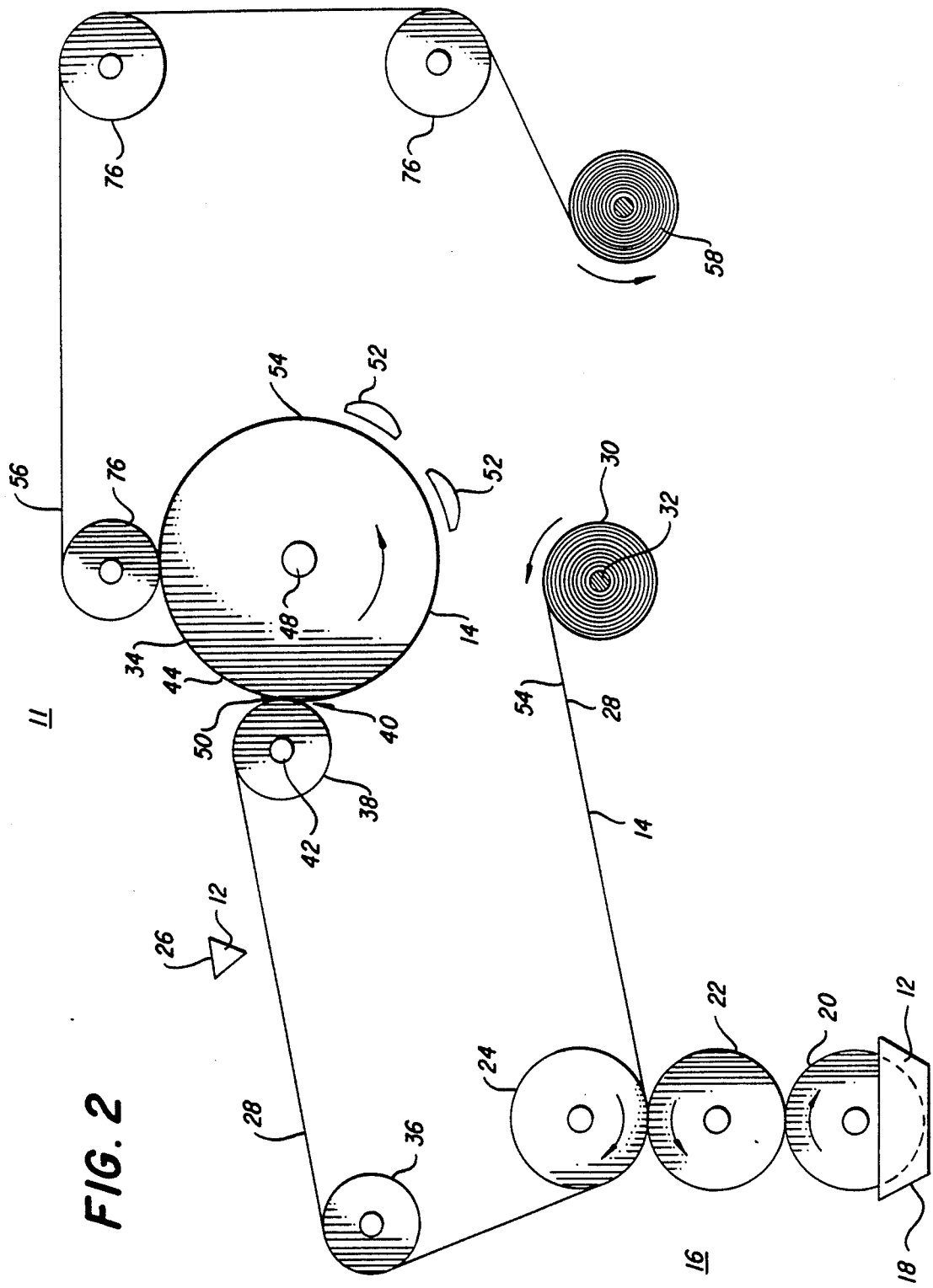
FIG. 2 is a schematic side elevational view of a film hardcoating section employing an intermediate storage roll for the hardcoated film.

Preparation of the hardcoated sheet involves first preparing a hardcoated film via an ultraviolet radiation casting technique using the film hardcoating section 11 of apparatus 10 as depicted in FIGS. 1, 2 and 4. In FIGS. 1, 2 and 4, the coating composition material 12 is applied to a polycarbonate film 14 by a coating unit 16 which includes a reservoir 18, a gravure roll 20, a transfer roll 22 and an impression roll 24. The coating material 12 in reservoir 18 is continuously taken up by gravure roll 20. The use of a gravure roll coating system is well known in the art and is described, for example, in U.S. Pat. No. 4,302,486. Typically, the gravure roll has a ridged surface (not shown), with steel bars or a pattern of ridged dikes protruding from the roll surface, the depressions formed from such an array being capable of picking up and retaining the coating material 12 within reservoir 18. This arrangement allows coating material 12, while riding on the surface of gravure roll 20 which revolves in a clockwise direction, to be transferred to transfer roll 22, which is in circumferential contact with roll 20, and which revolves in a counterclockwise direction. Transfer roll 22 is driven by an outside power source (not shown) and will thereby coordinate the movement of gravure roll 20 (which may also be driven by an outside power source, not shown), and impression roll 24, described below.

Film roll 30 is a roll of uncoated, visually transparent and ultraviolet radiation transparent, polycarbonate film 14 wound around an elongated cylindrical core 32. Film 14 is unwound from roll 30 pursuant to the rotation of cylindrical casting drum 34 (described below), and is passed through a nip defined by the junction of transfer roll 22 and impression roll 24. Impression roll 24, rotating in a clockwise direction (i.e. in a direction opposite that of transfer roll 22) as depicted in FIGS. 1, 2 and 4, compresses film 14 against transfer roll 22, the latter applying coating material 12 to one surface 28 of film 14. It will be apparent to those skilled in the art that adjustments may be made in the coating system in order to apply the coating to the film efficiently. Typical adjustments involve roll speed, coating material viscosities, and nip spacings. Furthermore, it is not critical in the method of the present invention to apply coating material 12 by gravure roll means, as described above.

As an alternative, a coating unit 26 can be employed which continuously pours a thin stream of liquid onto the surface 28 of the film 14.

After coating material 12 is applied to the one surface 28 of the film 14, film 14 is guided around idler roll 36 to nip roll 38. The choice of materials which form the rolls used in the present invention is not critical. The rolls may be made of plastic, metal (i.e. stainless steel, aluminum), rubber, ceramic materials, and the like. Furthermore, the surface of each roll should be smooth and resilient. Typically, each roll is provided with a sleeve or cover on its surface. Nip roll 38 may be provided with such a sleeve, preferably formed from a resilient material such as tetrafluoroethylene or polypropylene, or from one of the variety of currently available synthetic rubber compounds and blends thereof. The sleeve is snugly fitted over the roll surface to provide a smooth, friction-minimizing surface for contacting film 14. The position of nip roll 38 is adjustable relative to the position of casting drum 34, described below, and may optionally be independently driven.

As shown in the figure, casting drum 34 is situated in a position adjacent nip roll 38, such that the outer circumferences of nip roll 38 and drum 34 are closely adjacent to each other defining a nip 40. For the purpose of clarity, this particular nip will hereinafter be referred to as a constant pressure compression nip 40. The applied pressure at the interface of nip roll 38 and drum 34 may be adjusted to an exact pressure by well-known methods, such as a spring mechanism (not shown), attached to the axle 42 of nip roll 38, which selectively urges the roll toward drum 34 at the desired applied pressure. The applied pressure can be readjusted according to a variety of parameters when the film 14 having the uncured coating thereon is passing through nip 40, as described below. The parameters include film speed, coating viscosity and the surface characteristics of casting drum 34. Once the parameters are established and the applied pressure is selected, the resultant uncured coating thickness on the film will be substantially uniform irrespective of normal variations in thickness of the film 14, for example variations of ±10% thickness are common in polycarbonate films, thereby providing a uniform coating having the desired coating thickness. A uniform hardcoat thickness is necessary to ensure that the hardcoat is thick enough to provide the film with adequate abrasion resistance while also ensuring that the hardcoat is thin enough to permit the hardcoated film to have the required degree of flexibility without any cracking or shattering of the hardcoat either during the hardcoating process, during intermediate storage in roll form, or during subsequent lamination onto polycarbonate sheet.

The peripheral surface 44 of cylindrical casting drum 34 may be provided with a wide variety of textures or patterns, depending upon the texture or pattern desired for a cured coating 46 and should be made from a material which will release the coating following cure thereon. Preferably, the drum surface 44 is comprised of stainless steel or chromium-plated steel. Drum 34 surrounds central axle 48 and it is preferred that the drum 34 be independently driven by an outside power source (not shown).

The masking advantages of the present process are most apparent where a smooth hardcoat is desired. A smooth, high gloss hardcoat may be provided by employing a highly polished chrome-plated surface 44 on the drum 34. If a lower sheen is desired for the coating, surface 44 may be less polished, or may be rubberized so as to provide a low gloss matte texture to the coating. The cured coating 46 will thus become a permanent mirror-image of casting drum surface 44.

If diatomic oxygen is present in the acrylic coating during ultraviolet radiation curing thereof then effective cure is greatly inhibited. In order to ensure the exclusion of air from and adjacent to coating 12 prior to curing, without the use of a nitrogen gas blanket, the exact pressure exerted at air expulsion nip 40 is selected so that a small bead 50 of excess coating composition is allowed to form upstream from and adjacent to the nip 40. The adjustment of applied pressure at air expulsion nip 40 may be accomplished as described above. The exact pressure exerted at nip 40 in combination with other factors, e.g., the viscosity of coating 12, the degree of detail in the design pattern on surface 44 (if present) and the speed of the film will effectively determine the thickness of coating 12 passing through the nip 40. Thus, once the various parameters are fixed the coating thickness produced will be substantially uniform, varying less than ±10% regardless of variation in the thickness of the relatively thick polycarbonate film. Typically, for an aromatic polycarbonate film having a thickness of 5 mils having applied thereon an acrylic-based coating having a thickness of 0.6 mil and a viscosity of 800 centipoises at a coating rate of 50 feet of film per minute, an air expulsion nip pressure of 25 pounds/-square inch applied at the nip 40 to the coated substrate is sufficient to create a bead 50 from excess coating material and to expel any air which is within coating 12 as it passes through the nip 40 so that diatomic oxygen is absent from the coating when the uncured coating is downstream from the nip 40 and in contact with both the film 14 and the drum surface 44. Coating 12 is thereby pressed into full anaerobic contact with both the one surface 28 of film 14 and the casting drum surface 44, thereby ensuring that the coating 12, when cured, will exhibit strong adherence to the film 14 while also exhibiting a mirror image of the texture of casting drum surface 44. As previously mentioned, the preferred drum surface 44 is a highly polished chrome surface which will provide a high quality high gloss hardcoat 46.

The bead 50 serves to allow the coating material to spread across the entire width of the film 14 upstream from the nip 40 thereby ensuring that the entire width of the film 14 is coated before the film 14 passes through the nip 40.

After film 14 having coating 12 applied thereon passes through air expulsion nip 40, the coating is cured by means of ultraviolet radiation energy. As shown in FIGS. 1, 2 and 4, the ultraviolet radiation energy is transmitted from ultraviolet radiation energy means 52 into an uncoated second surface 54 of transparent film 14 opposite the surface 28 which has coating 12 thereon. The ultraviolet radiation energy passes through the transparent film 14 and is absorbed by the applied coating 12, the latter being of a substantially uniform thickness compressed between film 14 and drum surface 44. The preferred wavelength of the UV radiation is from about 1800 Angstroms to about 4000 Angstroms. The lamp system used to generate such UV radiation may consist of discharge lamps, e.g. xenon, metallic halide, metallic arc, or high, medium, or low pressure mercury vapor discharge lamps, etc., each having operating pressures of from as low as a few milli-torrs up to about 10 atmospheres. The radiation dose level applied to coating 12 through film 14 may range from about 2.0 J/cm$_2$ to about 10.0 J/cm$_2$. A typical UV curing system suitable for the present invention is a Linde medium pressure mercury lamp, as described in U.S. Pat. No. 4,477,529. The number of lamps directing UV light through the film 14 is not critical; however, a greater number of lamps may allow a higher production rate for the film 14 having coating 12 thereon. Typically, two lamps, each producing 200 watts/linear inch of radiant energy, are sufficient for curing an acrylic coating composition having a thickness of about 0.5 mils, when the production line speed is about 50 feet/minute. Such a curing procedure should result in both the polymerization of the polyfunctional acrylic monomers and the cross-linking of the polymers to form hard, abrasion-resistant, non-tacky coatings and a resultant hardcoated polycarbonate film 56 as shown in FIG. 7. The preferred cured coating thickness is from about 0.1 mil to about 1.0 mil. This coating thickness provides adequate abrasion resistance to the coated surface of the polycarbonate film while also minimizing the amount of coating material used and allowing the hardcoated film to exhibit a desired degree of flexibility. The hardcoated film must be sufficiently flexible to wrap around the circumference of a cylinder of radius 3 inches without the hardcoat cracking in order that the process of the present invention may be employed to provide a crack-free, high-quality hardcoated film 56.

Figure 3:
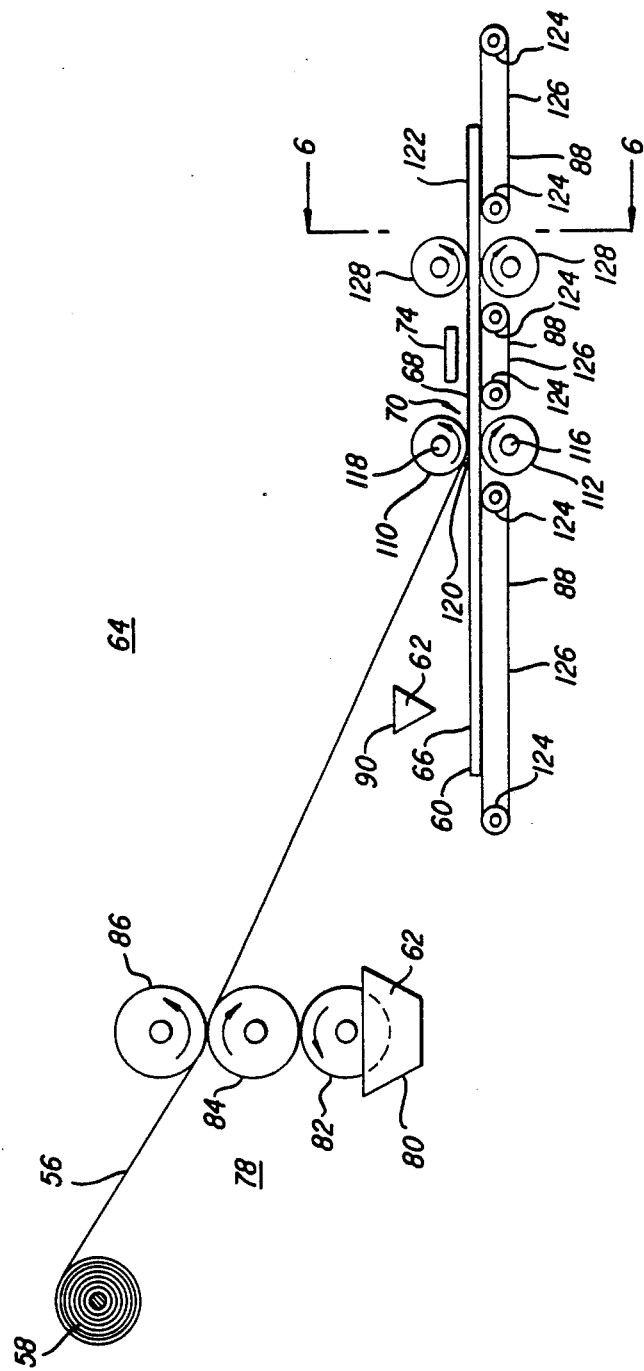
FIG. 3 is a schematic side elevational view of a laminating section employing an intermediate storage roll for the hardcoated film.

The hardcoated film 56 can be either directly fed into the apparatus for the lamination process (as depicted in FIG. 1) or can be rolled onto an intermediate storage roll 58 for temporary storage (as depicted in FIG. 2) until needed for the lamination process (as depicted in FIGS. 3 and 5). The lamination process involves the use of the hardcoated film 56, an aromatic polycarbonate sheet substrate 60, and an ultraviolet radiation curable, solvent free adhesive 62.

The aromatic polycarbonate sheet 60 is made from a polycarbonate selected from the polycarbonate resin set forth above for the aromatic polycarbonate film 14. The preferred polycarbonate resin for the sheet 60 is the same polycarbonate resin set forth above as the preferred resin for the polycarbonate film 14. The thick sheet 60 due to its thickness is rigid and lacks the degree of flexibility required in the casting process described above for the coating of the thin film 14. The sheet 60 has a thickness selected from between 35 mils and 1000 mils and will typically have thickness variations of as much as ±5%. The sheet hardcoating process of the present invention which combines the high-speed, high-quality film hardcoating process described above with the sheet laminating process described below provides a sheet hardcoating process which is faster than conventional sheet coating techniques and which provides much higher quality hardcoated sheet than do conventional processes.

The ultraviolet radiation curable acrylic adhesive composition 62 for the lamination step comprises acrylate ester monomers selected from the same group of acrylate ester monomers set forth in the description of the acrylic coating composition 12. The adhesive composition 62 further comprises a photoinitiator selected from the same group of photoinitiators as set forth above for the acrylic coating composition 12. The preferred acrylic adhesive composition 62 is the same as the preferred acrylic coating composition 12 also described above.

FIGS. 1, 3, 4 and 5 set forth a laminating section 64. FIGS. 1 and 2 show employing the section 64 in the continuous hardcoating of sheet, whereas FIGS. 3 and 5 set forth the section 64 for the lamination step in situations where the hardcoated film 56 is rolled onto storage roll 58 for temporary storage between the hardcoating of the film 14 and the laminating of the film 56 onto the sheet 60.

The laminating process broadly involves applying the ultraviolet radiation curable adhesive 62 to either the uncoated surface 54 of the hardcoated film 56 or to top surface 66 of the sheet 60, overlaying the hardcoated film 56 onto the sheet 60 such that the adhesive 62 is sandwiched between the film surface 54 and the sheet surface 66, passing the sheet, film and adhesive through a laminating nip 70, thereby forming an overlay 68 having a thin uncured adhesive layer 72 between the sheet 60 and the film 56, the adhesive layer 72 is then cured by exposure to ultraviolet radiation from an ultraviolet radiation energy source 74 so as to bond the film 56 to the sheet 60.

In more detail, the hardcoated film 56 is either unrolled from storage roll 58 as depicted in FIGS. 3 and 5 or is transferred directly from an idler roll 76 as depicted in FIGS. 1 and 4. The hardcoated film 56 is then fed to an adhesive applying unit 78 which is substantially similar to the coating unit 16. The adhesive composition 62 in reservoir 80 is continuously taken up by gravure roller 82. The adhesive composition 62 rides on the surface of the gravure roller 82 which revolves in a counterclockwise direction, to be transferred to transfer roller 84, which is in circumferential contact with roller 82, and which rotates in a clockwise direction. Transfer roller 84 is driven by an outside power source (not shown) and will thereby coordinate the movement of gravure roller 82 (which may also be driven by an outside power source, not shown), and impression roller 86, described below. The film 56 moves pursuant to the movement of sheet 60 which is horizontally advanced from left to right by powered conveyor 87 which has several horizontally spaced sections 88. The hardcoated film 56 is passed through a nip defined by the junction of transfer roller 84 and impression roller 86. Impression roller 86, rotating in a counterclockwise direction (i.e. in a direction opposite that of transfer roller 84), compresses uncoated surface 54 of film 56 against transfer roller 84 thereby applying the adhesive composition 62 to the uncoated surface 54 of hardcoated film 56. Adjustments such as roll speed, adhesive composition viscosities, and nip pressure may be made in order to apply the adhesive composition to the surface 54 of film 56 efficiently.

Alternatively, an adhesive applying unit 90 can be employed which applies a stream of adhesive 62 to the top surface 66 of the sheet 60.

The sheets 60 may be fed into the laminating process as discrete individual sheets as shown in FIG. 1 or preferably as shown in FIG. 4 may be fed continuously into the lamination process from a sheet producing unit 94 which includes an extruder 96 which continuously extrudes hot polycarbonate resin through an elongated die slit (not shown). The extruded polycarbonate resin then passes between vertically spaced apart polishing roll 98 and first cooling roll 100 as shown in FIGS. 4 and 5. Polishing roll 98 preferably has a smooth chrome surface and polishes the top surface 66 of the hot sheet 60. First cooling roll 100 is maintained at a temperature below that of the sheet 60 and cools a bottom surface 102 of the sheet 60. Sheet 60 then passes downwardly between horizontally spaced apart first cooling roll 100 and second cooling roll 104. The top surface 62 of the partially cooled sheet 60 then comes into contact with cooling roll 104 and stays in contact therewith as the sheet 60 bends upwardly and passes between horizontally spaced rolls 104 and 106. The sheet 60 then is passed between two vertically spaced rolls 106 and 108 and is directed horizontally to the conveyor 87.

After the adhesive composition 62 is applied to surface 54 of film 56, the film 56 is guided under idler roller 110 such that the hardcoat 46 contacts roller 110. The roller 110 is spaced above a support roller 112 and forms the laminating nip 70 therebetween. The support roller 112 is able to rotate about a central axis 116 which is in a substantially fixed position in conveyor system 87. The position of roller 110 is vertically adjustable by mechanisms attached to an axis 118 thereof and the pressure exerted by roller 110 is adjustable by springs or the like. The adhesive carrying surface of the film 56 is overlayed onto the top surface 66 of the sheet 60 to create the sheet/film overlay 68. The overlay 68 is passed through the laminating nip 70 which applies sufficient pressure to the overlay 68 to prevent excess adhesive from passing through the nip 70 thereby forming a bead 120 of adhesive 62 upstream of and adjacent to the nip 70. The bead 120 helps exclude air from between the film 56 and sheet 60 as the overlay 68 passes through the nip 70. The pressure exerted by roller 110 may be set, thereby ensuring that a substantially uniform and exact adhesive layer thickness is obtained as the overlay passes through the nip so that the thickness of the uncured adhesive layer 72 is uniform, preferably selected from between 0.2 mil and 2.0 mils, regardless of variations in the thicknesses of the hardcoated film 56 and the uncoated sheet 60. The overlay 68 is then passed under the ultraviolet radiation energy source 74 which directs ultraviolet radiation energy through the film 56 and into impingement with the uniformly thick adhesive layer 72 thereby effecting cure of the layer 72 to form a uniformly thick, cured adhesive layer 121 having a thickness preferably selected from between 0.2 mil and 2.0 mils. The cured layer 121 effectively bonds the hardcoated film 56 to the aromatic polycarbonate sheet 60 to form a hardcoated sheet 122. The conveyor system 87 continuously moves the sheet 60 during the process so that numerous sheets may be sequentially hardcoated by the present process. Alternatively, laminating, as illustrated in FIGS. 4 and 5, may be on-line immediately upstream from a sheet extrusion process illustrated by sheet producing unit 94 prior to cutting the continuous sheet of polycarbonate into individual discrete sheets and, thus, serve as a completely continuous process for producing hardcoated sheet.

The employ of the hardcoated film 56 effectively masks any defects such as pits or small fragments of acrylic hardcoat or small pieces of sand which are commonly found at the surface 66 of sheets employing reground scrap or waste. The present process produces hardcoated sheet which exhibits substantially improved aesthetic appearance over conventional coating processes when the initially uncoated sheets coated have low quality surfaces. Problems associated with conventional sheet coating processes may be in part due to the surface defects of the sheets being too close to the outer surface of the hardcoat when thin coatings are used in conventional processes and may also be due in part to prior to curing of the coatings, the viscosity of the solvent-free acrylic coatings being too high to permit adequate leveling of the coatings over these common surface defects when conventional sheet coating techniques are employed. The present process allows the employ of relatively low cost regrind and recycled polycarbonate resin in the production of sheet without a consequent reduction in quality of the hardcoat or the surface appearance of the hardcoated sheet. Preferably the relatively thin film should be made from high quality virgin resin but any scrap or waste therefrom may be employed in production of the relatively thick uncoated sheet 60. Since the ultraviolet radiation used to cure the adhesive layer and the coating does not ever need to pass through the sheet 60, the sheet 60 may be transparent or may be opaque and may be any color desired. The conveyor 87 is preferably horizontal, moving the sheet from left to right as depicted in FIGS. 1, 3, 4 and 5. Each conveyor section 88 has a pair of horizontally spaced rotating shafts 124 which support at least one conveyor belt 126 entrained around each pair of shafts 124. At least one of the sections 88 is powered by a source (not shown) which rotates the belt 126 thereof in a clockwise fashion. The conveyor belts 126 move substantially clockwise and support the sheet 60 such that functional engagement therebetween causes the sheet 60 to move from left to right as viewed in FIGS. 1, 3, 4 and 5 thereby drawing the film 56 with the sheet 60 through the laminating nip 70.

FIG. 6 depicts a portion of the resultant hardcoated sheet 122 having the initially uncoated polycarbonate sheet 60, the cured adhesive layer 121, and the hardcoated film 56. FIG. 7 depicts a cross section of the hardcoated film having the cured coating 46 adhered to the base film 14. Downstream from the UV radiation source 74 and within the conveyor system 87 are vertically spaced apart pull rolls 128 which are rotably powered and which engage opposite surfaces of hardcoated sheet 122 to pull the hardcoated sheet 122 thereby pulling the hardcoated film 56, sheet 60 and adhesive 62 through the nip 70.

What is claimed:

1. A process for producing a hardcoated aromatic polycarbonate resin sheet, said process comprising the steps of:
   (a) hardcoating a flexible aromatic polycarbonate film having a thickness selected from between about 0.5 mils and about 30 mils, the hardcoating of the film being a continuous procedure involving:
      (i) applying an uncured coating material to the film, the coating material comprising an amount of polyfunctional acrylate ester monomers and an amount of a photoinitiator,
      (ii) passing the film and applied uncured coating material through a constant pressure compression nip, the compression nip pressure being selected from between about 5 psi to about 50 psi to provide a substantially uniform layer of uncured coating material on the film,
      (iii) anaerobically contacting the uniform coating layer with a peripheral surface of a longitudinally rotateable, cylindrical casting drum,
      (iv) curing the coating layer by directing ultraviolet radiation through the film to the coating layer while the coating layer is in contact with the drum surface to provide a hardcoated film having a cured coating having surface characteristics determined by the casting surface, the cured coating having a thickness selected from between 0.1 mils and 1.0 mils; and
   (b) laminating the hardcoated film onto a rigid aromatic polycarbonate substrate, the substrate having a thickness selected from between about 35 mils to about 1000 mils, the laminating involving:
      (i) preparing an overlay by placing an amount of an acrylic adhesive between a surface of the substrate and an uncoated surface of the hardcoated film, and by bringing the uncoated surface of the film into a position adjacent to the surface of said substrate;
      (ii) passing the overlay through a laminating nip to eliminate diatomic oxygen from between the film and the substrate, and from the adhesive, said laminating nip pressing the overlay with a substantially constant pressure to create a substantially uniform layer of adhesive between the film and the substrate; and (iii) curing the adhesive layer by directing ultraviolet radiation through the film to the adhesive layer to cure the adhesive layer and bond the hardcoated film to the substrate, said cured adhesive layer having a thickness selected from between 0.2 mils and 2.0 mil.

2. The process of claim 1 wherein said hardcoated film is rolled into the form of cylindrical roll and stored following said hardcoating step and prior to said laminating step, said hardcoated film having a coating hardness such that the hardcoat thereon experiences no more than 10 percent haze after 500 cycles of a CS10F Tabor abrasion wheel at a 500 gram loading, said hardcoated film having a degree of flexibility sufficient to allow said hardcoated film to be wrapped around the circumference of a cylinder of radias 3 inches without cracking of said hardcoat.

* * * * *